US012704224B2

(12) United States Patent
Hall et al.

(10) Patent No.: US 12,704,224 B2
(45) Date of Patent: Aug. 11, 2026

(54) TRANSPORTATION OF THE LARGE SIZE UNIT CONSISTING OF A STORAGE TANK AND A BASE SLAB

(71) Applicant: CB&I STS Delaware LLC, Houston, TX (US)

(72) Inventors: Mark Anthony Hall, Houston, TX (US); Alexander Cooperman, Lisle, IL (US); Joseph Jay Glodoski, Plainfield, IL (US)

(73) Assignee: CB&I STS Delaware LLC, The Woodlands, TX (US)

( * ) Notice: Subject to any disclaimer, the term of this patent is extended or adjusted under 35 U.S.C. 154(b) by 82 days.

(21) Appl. No.: 18/825,363

(22) Filed: Sep. 5, 2024

(65) Prior Publication Data

US 2025/0084961 A1 Mar. 13, 2025

Related U.S. Application Data

(60) Provisional application No. 63/598,752, filed on Nov. 14, 2023, provisional application No. 63/581,223, filed on Sep. 7, 2023.

(51) Int. Cl.
*F17C 1/08* (2006.01)
*F17C 1/14* (2006.01)

(52) U.S. Cl.
CPC .................. *F17C 1/08* (2013.01); *F17C 1/14* (2013.01); *F17C 2201/0147* (2013.01);
(Continued)

(58) Field of Classification Search
CPC ...... F17C 1/08; F17C 1/14; F17C 2201/0147; F17C 2203/0695; F17C 2225/0161; F17C 2270/0168
(Continued)

(56) References Cited

U.S. PATENT DOCUMENTS 3,988,995 A * 11/1976 Finsterwalder ......... B63B 25/16 220/901
6,090,465 A * 7/2000 Steele ......................... F17C 1/06 428/102
(Continued)

FOREIGN PATENT DOCUMENTS

JP 5896749 B2 3/2016
WO 2017198349 A1 11/2017
(Continued)

OTHER PUBLICATIONS

East Carolina University (Non-Patent Literature, retrieved at https://oehs.ecu.edu/industrial-hygiene/compressed-gas/). (Year: 2021).*
(Continued)

*Primary Examiner* — Christopher M Afful
(74) *Attorney, Agent, or Firm* — Patterson + Sheridan, LLP

(57) ABSTRACT

A method and apparatus for transporting a liquid gas container is described herein. The liquid gas container is transported at an increased internal pressure. Transporting the liquid gas container at an increased internal pressure distributes the downward load of the liquid gas container, such that the downward load of the liquid gas container is distributed more evenly or so that a greater amount of the downward load is felt in the center of the liquid gas container compared to the outer portion of the liquid gas container. This enables transport without cracking of a base support slab during transit when the support slab is only able to be supported from the center due to narrow road conditions.

16 Claims, 3 Drawing Sheets

(52) U.S. Cl.
CPC ................. *F17C 2203/0695* (2013.01); *F17C 2225/0161* (2013.01); *F17C 2270/0168* (2013.01)

(58) Field of Classification Search
USPC ............................................................... 141/3
See application file for complete search history.

(56) References Cited

U.S. PATENT DOCUMENTS

| | | | | |
|---|---|---|---|---|
| 6,354,321 | B1 * | 3/2002 | Horst | F17C 11/00 137/259 |
| 2008/0178612 | A1 * | 7/2008 | Utata | F17C 7/04 62/50.2 |
| 2010/0050925 | A1 * | 3/2010 | Donnelly | B63B 35/28 62/53.2 |
| 2015/0240996 | A1 | 8/2015 | Kapoor | |
| 2016/0230934 | A1 * | 8/2016 | Friesen | F17C 1/00 |
| 2018/0245739 | A1 * | 8/2018 | Vaughn | F17C 3/12 |
| 2022/0299164 | A1 * | 9/2022 | White | F17C 3/022 |
| 2023/0392536 | A1 * | 12/2023 | Thobe | F17C 7/00 |

FOREIGN PATENT DOCUMENTS

| | | | | |
|---|---|---|---|---|
| WO | WO-2021069095 | A1 * | 4/2021 | F17C 13/025 |
| WO | 2023046381 | A1 | 3/2023 | |

OTHER PUBLICATIONS

NPL—Cryomed https://cryomed.pro/equipment/cryogenic-tanks/pressurized-tanks/ (Year: 2022).*
NPL—Brookhaven National Laboratory safetygram (Year: 2010).*
Emmert International (Youtube Video) https://www.youtube.com/watch?v=q8t0hqZIt6M (Year: 2021).*
WO 2021069095 A1—English Translation (Year: 2021).*
NPL—NASA Fact Sheet (Crawler-Transporters) (Year: 2025).*
PCT/US2024/045244, International Search Report and Written Opinion dated Dec. 18, 2024, 14 pages.

* cited by examiner

TRANSPORTATION OF THE LARGE SIZE UNIT CONSISTING OF A STORAGE TANK AND A BASE SLAB

CROSS-REFERENCE TO RELATED APPLICATIONS

This application claims benefit of U.S. Provisional Application No. 63/581,223, filed Sep. 7, 2023, and U.S. Provisional Application No. 63/598,752, filed Nov. 14, 2023, which are herein incorporated by reference in their entirety.

BACKGROUND

Field

Embodiments of the present disclosure generally relate to transportation of a storage container, such as a liquid gas storage container, from a site where the container is constructed to a site where the container is to be utilized.

Description of the Related Art

Vertical cylindrical flat bottom storage tanks are widely used to store liquid product at ambient temperature and liquefied gases at refrigerated conditions. The storage tanks may be assembled at the fabrication facility and relocated to a final destination. The storage tank structure is designed to handle the internal pressure of the liquid product required during storage of the liquid product.

Due to the height/diameter aspect ratio and the significant loads at the perimeter of the storage tank due to the weight of the storage tank walls and roof structure, transportation of the storage tank designed for refrigerated liquefied gas (RLG) storage may be difficult, as these tanks often have two walls and roofs (or a roof with a suspended deck), as well as insulation installed prior to transportation. Storage tanks housing RLGs often have increased wall thicknesses, adding weight to the perimeter of the storage tank. The storage tanks are further designed to resist an internal pressure of several pounds/in$^2$ (psi) gage during operation and transportation.

During transportation of the storage tank, a sufficiently wide road capable of accommodating the entire footprint of the tank and its foundation is often not available. Narrow roads cause a portion of the storage tank to overhang the sides of the transporters. The overhanging portions of the storage tank cause overloading of the storage tank structure due to self-weight and the overall tank weight is not uniformly distributed, which may damage the transporter and the tank structure.

Therefore, there is a need in the art for an economical method of transporting RLG storage vessels with reduced damage to the transporter. There is also a need to be able to store these gases in a liquid state at industrial quantities.

SUMMARY

The present disclosure generally relates to a cylindrical flat bottom storage tank. In particular, the disclosure relates to transportation of a storage tank storing refrigerated liquefied gas (RLG). The disclosure also applies to transportation of any flat-bottom storage tank designed for the internal pressure required during transportation.

In one embodiment, a method of transporting a liquid gas container is described. The method includes loading the liquid gas container onto a transport vehicle, pressurizing an inside cavity of the liquid gas container to a pressure, and transporting the liquid gas container from a first location to a second location while pressurized.

In another embodiment, a method of transporting a container is described. The method includes loading the container onto a transport vehicle, the container comprising a support slab and at least one shell disposed on top of the support slab. An inside cavity of the container is pressurized to a pressure. The container is transported from a first location to a second location while pressurized and while an outer perimeter portion extends outward from a support surface of the transport vehicle, such that at least a portion of the support slab overhangs from the support surface of the transport vehicle.

In another embodiment, a method of transporting a liquid gas container is described. The method includes loading the liquid gas container onto a transport vehicle. An inside cavity of the liquid gas container is pressurized to a pressure. The liquid gas container is then transported from a first location to a second location while pressurized. The liquid gas container includes as least one cryogenic metal shell forming the inside cavity and a support slab which supports the downward load of the cryogenic metal shell, a width of one or both of the support slab and the at least one shell being greater than a road in a direction perpendicular to a direction of travel on the road during transporting of the container.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure is related to a method of transporting a liquid gas container while the container is in a pressurized condition. Previously, when transporting liquid gas containers, the transportation was conducted in a non-pressurized condition. The non-pressurized condition was adequate when appropriate road widths were available along the intended transport route. However, as the size of liquid gas containers has increased to account for more industrial use of liquid gases (such as liquid natural gas (LNG), liquid ammonia, liquefied petroleum gas (LPG), etc.), the ability to transport liquid gas containers has become more difficult. While road widths are greater than the width of the base of the liquid gas container, one or more transporters are able to distribute the downward load and support an edge of the liquid gas containers. However, some roads are narrower than the width of a base of the liquid gas containers. When the roads along a route are narrower than the width of a liquid gas container, it is more difficult to support an outer edge of the liquid gas container. Therefore, a container wall applies downward force at the outer edge of the base slab. This can cause downward deflection of the base overhang of the liquid gas container and upward bowing of the base center to such an extent that the base can crack or fracture. Further, any transporters which are located closer to the edge of the liquid gas container base may be overloaded. The uneven downward load distribution of the liquid gas container is caused, at least in part, by the container's shape. In some embodiments, the container is a cylinder. In yet other embodiments, the base is a prism, such as a pentagonal prism, a hexagonal prism, a heptagonal prism, an octagonal prism, a nonagonal prism, or a decagonal prism. Any prisms which have more than ten rectangular faces are considered a cylinder. The cylindrical or prism shape may include at least one semi-circular cap on either end of the cylinder or prism.

To fix this problem, the inventors of the present disclosure propose pressurizing the liquid gas container before transporting the liquid gas container. Pressurizing the liquid gas container causes a re-distribution of the downward load of the liquid gas container from the outer edges of the base towards the center of the base. Therefore, the downward load at the center may be greater than the downward load at the edges or more uniform with the downward load at the edges of the base.

Figure 1:
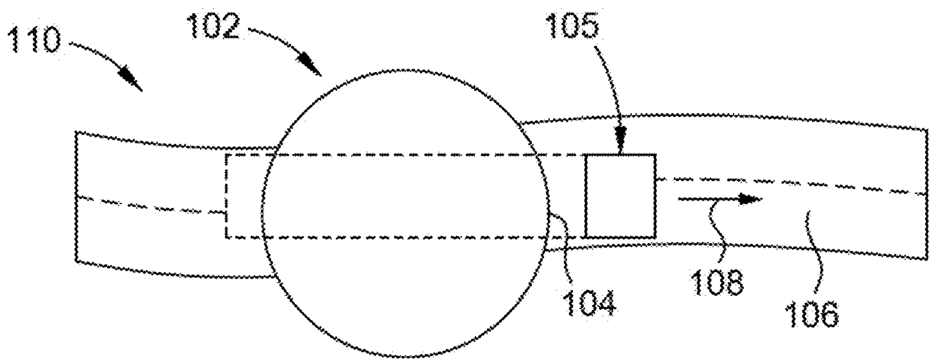
FIG. 1 is a schematic plan view of a liquid gas container being transported on a road, according to embodiments described herein.

FIG. 1 is a schematic plan view of a liquid gas container 102 being transported on a road 106. The liquid gas container 102 is disposed on one or more transporters 105. The one or more transporters 105 may include one or more transport mechanisms. The one or more transporters 105 have a support surface 104.

The liquid gas container 102 is wider than the support surface 104 of the transporter 105. The liquid gas container 102 is also wider than the road 106. Therefore, at least a portion of the liquid gas container 102 extends over a shoulder 110 of the road 106. The width of the liquid gas container 102 perpendicular to the road 106 is therefore greater than the width of the road 106 while the transporter 105 is transporting the liquid gas container 102 in a direction of travel 108. The liquid gas container 102 may have a width in a direction perpendicular to the direction of travel 108. The width may be measured from the width of the support slab and/or the width of at least one shell. In some embodiments, the width is greater than 20 meters, such as greater than 25 meters, such as greater than 30 meters, such as greater than 35 meters, such as greater than 40 meters. The liquid gas container 102 may also have a mass of greater than 2500 metric tons, such as greater than 3000 metric tons, such as greater than 3500 metric tons, such as greater than 4000 metric tons, such as greater than 4500 metric tons, such as greater than 5000 metric tons.

Figure 2:
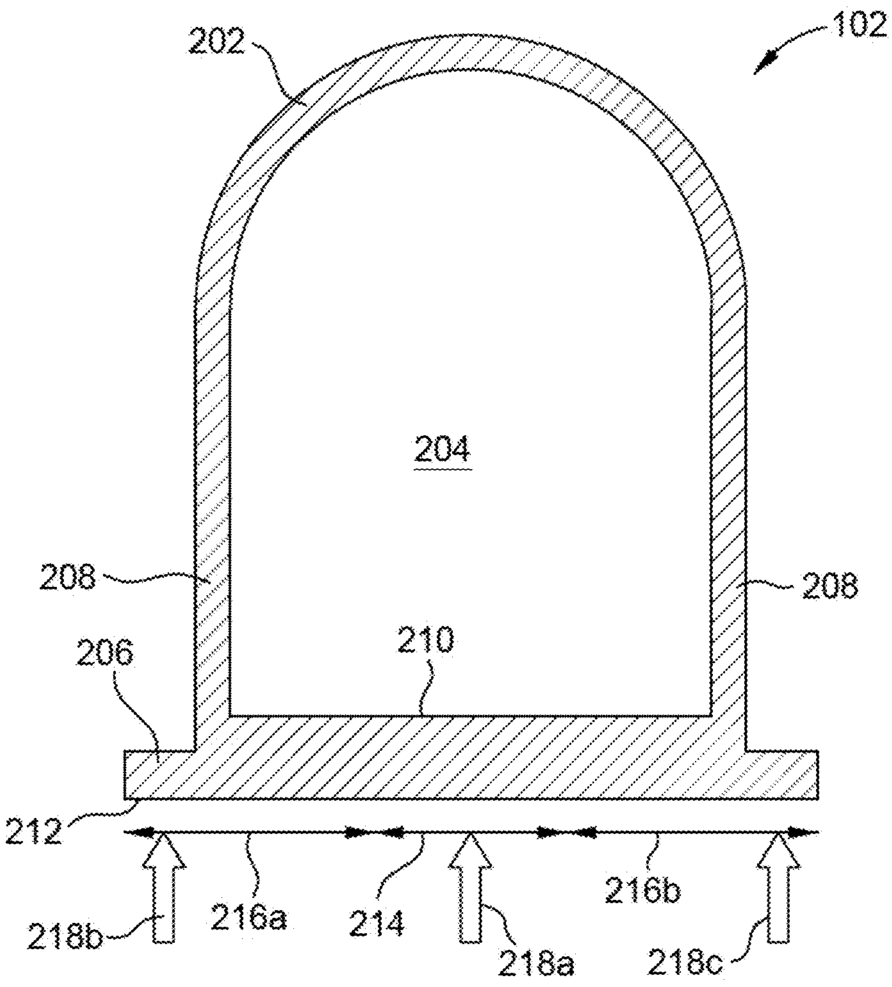
FIG. 2 is a schematic cross-sectional side view of a liquid gas container and various loading points of the liquid gas container, according to embodiments described herein.

FIG. 2 is a schematic cross-sectional side view of a liquid gas container 102 and various loading points 218 of the liquid gas container 102. The liquid gas container includes one or more shells 202 which form an inside cavity 204. The inside cavity 204 is configured to receive and store a liquefied gas LNG, ammonia, or liquefied petroleum gas (LPG). In some embodiments, the liquid gas container 102 is a cryogenic liquid gas container, such that the one or more shells 202 may be formed of a metal material suitable for storage of refrigerated product, such as a cryogenic steel, aluminum, nickel, or titanium alloys, in order to accommodate liquid gases stored at low temperatures. The one or more shells 202 are also configured to be at an adequate thickness to hold a liquid gas and may include one or more layers of insulation disposed around the one or more shells 202. In some embodiments, not shown, there are two shells (an inner shell and an outer shell) with one or more insulation layers between the two shells.

The one or more shells 202 may include one or more sidewalls 208 and one or more bottom walls 210. The one or more bottom walls 210 is disposed between the one or more sidewalls 208 and forms a floor of the inside cavity 204. The one or more shells 202 are disposed on top of a support slab 206. The support slab 206 is wider than the outer walls of the one or more shells 202 of the liquid gas container 102. The support slab 206 may be a concrete slab, such as a reinforced concrete slab, a pre-stressed concrete slab, a perlite concrete slab, or a structural slab with steel grillage. The support slab 206 is configured to support the downward load of the one or more shells 202 and other components of the liquid gas container 102. The support slab 206 is configured to contact one or more transporters, such that a bottom surface 212 of the support slab 206 contacts a support surface 104 of the transporter 105. The support slab 206 may be circular or polygonal in shape. The shells 202 may be circular in shape.

While unpressurized, the majority of the downward load of the one or more shells 202 comes down on the support slab 206 below the one or more sidewalls 208 of the one or more shells 202. Therefore, the downward load of the entirety of the one or more shells 202 is distributed such that the majority of the downward load of the one or more shells is around an outer region, such as a first outer region 216*a* or a second outer region 216*b*. A lesser downward load from the bottom wall 210 and the contents within the inside cavity 204 is disposed closer to the center of the support slab 206, such as the center region 214.

One or more transporters, such as the transporter 105, are used to move the liquid gas container 102 from one location to another. The transporter 105 may support the liquid gas container 102 at a variety of loading points, e.g., an inner loading point 218*a*, a first outer loading point 218*b*, and a second outer loading point 218*c*. A first outer loading point 218*b* and a second outer loading point 218*c* are adjacent to the edges of the support slab 206, while an inner loading point 218*a* is disposed at the center of the support slab 206. The inner loading point 218*a*, first outer loading point 218*b*, and second outer loading point 218*c* are adjusted depending upon the type of road and method of transporting the liquid gas container 102. When the liquid gas container 102 is transported along a narrow road, only an inner loading point 218*a* can be utilized and the first outer loading points 218*b* and the second outer loading point 218*c* adjacent to the edge of the support slab 206 are repositioned inward (e.g., repositioned closer to the inner loading point 218*a*) to accommodate for the width of the road.

Therefore, the first outer loading point 218*b* at the first outer region 216*a* and the second outer loading point 218*c* at the second outer region 216*b* of the support slab 206 are overloaded due to the need to accommodate for the lack of support at the overhangs of the first outer region 216*a* and the second outer region 216*b*. This may lead to fracturing of the support slab 206 as the support slab 206 bends to accommodate the lack of support of the first outer region 216*a* and the second outer region 216*b* of the support slab 206.

Figure 3A:
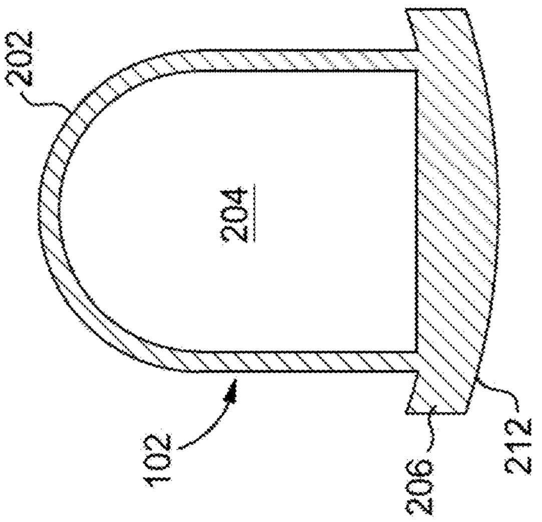
FIG. 3A is a liquid gas container during high pressurization within the inside cavity, according to embodiments described herein.
Figure 3B:
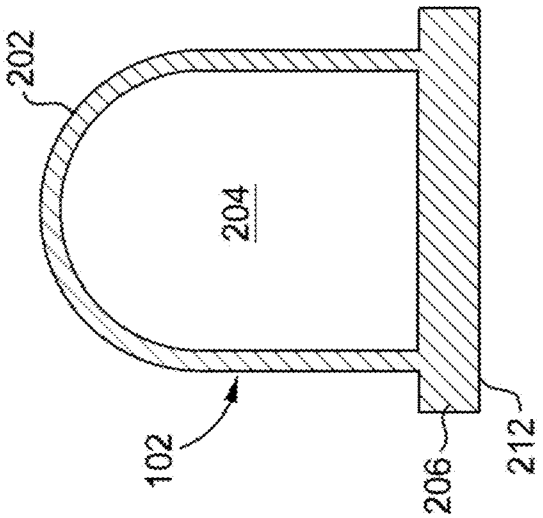
FIG. 3B is a liquid gas container during optimum pressurization within the inside cavity, according to embodiments described herein.
Figure 3C:
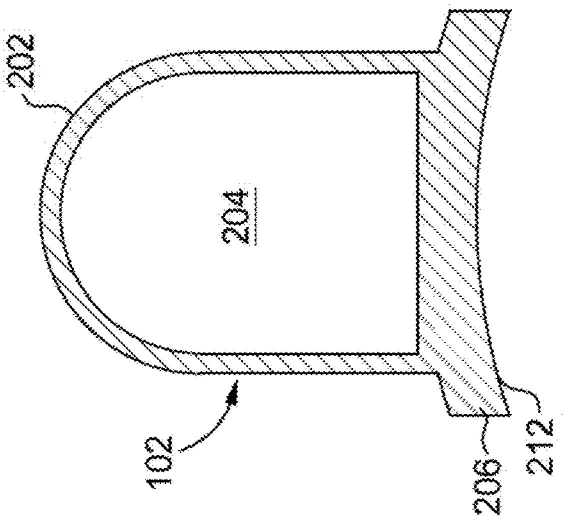
FIG. 3C is a liquid gas container during low pressurization within the inside cavity, according to embodiments described herein.
Figure 3D:
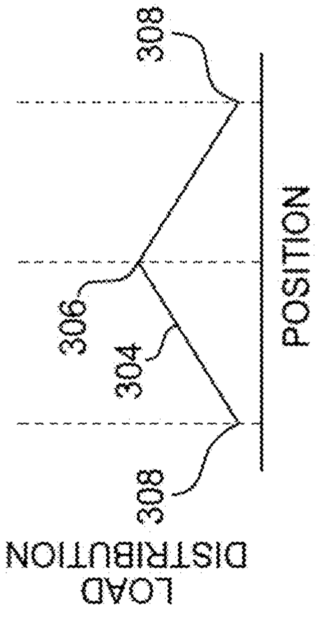
FIG. 3D is a graph of the downward load distribution during high pressurization within the inside cavity, according to embodiments described herein.

FIGS. 3A-3C are schematic cross-sectional side views of the liquid gas container 102 during various stages of pressurization of the liquid gas container 102. FIG. 3A is a liquid gas container 102 during high pressurization within the inside cavity 204. FIG. 3D is a graph of the downward load distribution during high pressurization within the inside cavity 204. During high pressurization, the bottom wall 210 bows out slightly and causes the bottom surface 212 to take on a convex shape. The downward load distribution 304 is such that the center of the support slab 206 is supporting a greater downward load than the edges of the support slab 206. Therefore, the force 306 at the center of the support slab 206 is greater than the force 308 at the edges of the support slab 206. Thus, high pressurization enables the transporter 105 to support the liquid gas container 102 from the center of the support slab 206 without supporting the outer edges of the bottom surface 212. By supporting the liquid gas container 102 from the center of the support slab 206, the likelihood of the support slab 206 cracking or fracturing the support slab or damaging the other tank components is reduced. The optimum pressurization inside the cavity 204 is selected to obtain uniform loading on transporter 105 and prevent excessive bowing and fracturing of the support slab 206. The support slab 206 may be bowed as shown in FIG. 3A if the pressure within the inside cavity 204 is greater than required to eliminate overloading of the outer portion of the slab 206, e.g., greater than about 1.5 psi, such as greater than about 4 psi.

Figure 3E:
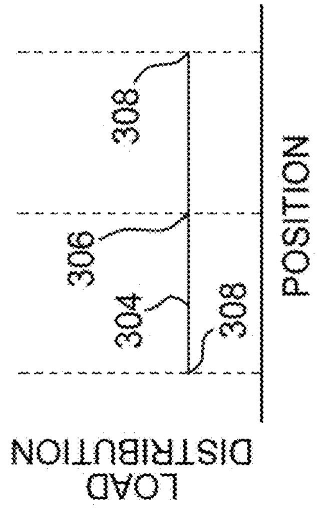
FIG. 3E is a graph of the downward load distribution during optimum pressurization within the inside cavity, according to embodiments described herein.

FIG. 3B is a liquid gas container 102 during optimum pressurization within the inside cavity 204. FIG. 3E is a graph of the downward load distribution during optimum pressurization within the inside cavity 204. The pressure within the inside cavity 204 of the liquid gas container 102 is such that the bowing of the support slab 206 is reduced and the downward load distribution 304 is relatively uniform across the portions of the support slab 206 disposed directly below the one or more shells 202. The pressure within the inside cavity 204 may be greater than about 4 psi. There may be bowing similar to that in FIG. 3A and the time and expense of pressurizing the inside cavity 204 becomes more expensive. The downward load distribution 304 is such that the center of the support slab 206 is supporting a downward load which is about equal to the downward load at the edges of the support slab 206. Therefore, the force 306 at the center of the support slab 206 is about the same as the force 308 at the edges of the support slab 206. Therefore, the transporter 105 supports the liquid gas container 102 from the center of the support slab 206 without supporting the outer edges of the bottom surface 212. Thus, the likelihood of cracking or fracturing the support slab 206 and damaging the other tank components is reduced.

Figure 3F:
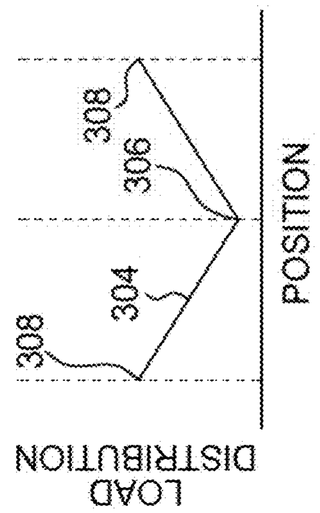
FIG. 3F is a graph of the downward load distribution during low pressurization within the inside cavity, according to embodiments described herein.

FIG. 3C is a liquid gas container 102 during low pressurization within the inside cavity 204. FIG. 3F is a graph of the downward load distribution during low pressurization within the inside cavity 204. The low pressurization causes the downward load distribution 304 to be such that the force 308 at the edges of the support slab 206 is greater than the force 306 at the center of the support slab 206. In embodiments wherein the liquid gas container 102 is not able to be supported from the edges of the support slab 206 in addition to the center of the support slab 206, the bottom surface 212 of the support slab 206 bows to a concave shape from the force exerted on the center portion of the bottom surface 212. The bowing and high force exerted at the center portion likely results in fracturing of the support slab 206 and damaging other tank components.

Figure 4:
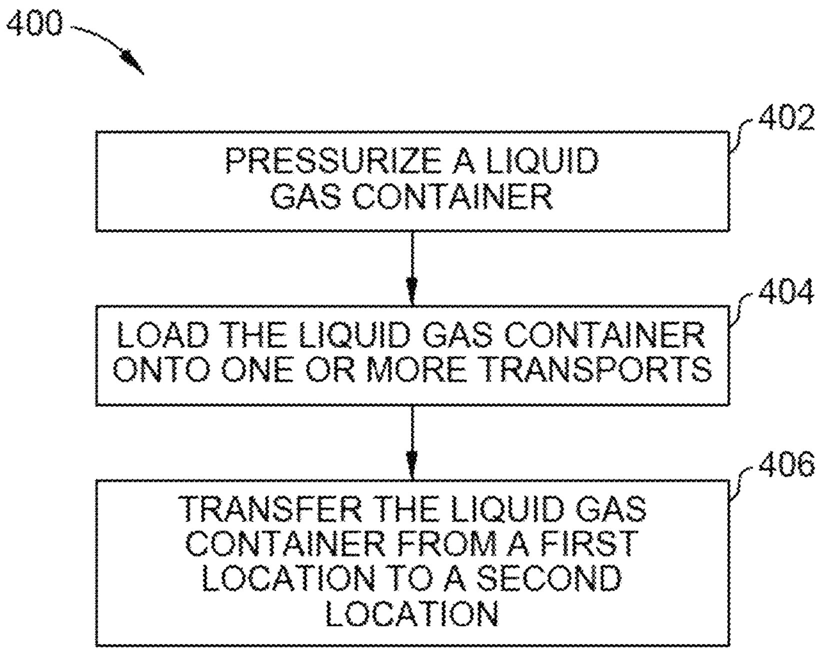
FIG. 4 is a method of transporting a liquid gas container, according to embodiments described herein.

FIG. 4 is a method 400 of transporting a liquid gas container, such as the liquid gas container 102. The liquid gas container 102 is of a similar size and construction as described above. The method 400 generally describes an improved method of transporting large liquid gas containers 102 between different locations with reduced damage to a support slab 206 and removal of concerns for damaging other tank components.

At operation 402, a liquid gas container 102 is pressurized to a pressure. The liquid gas container 102 may be pressurized using one or more compressors. An inside cavity 204 is configured to hold liquid gas, such as LNG, ammonia, or LPG, when in use at the end destination. The inside cavity 204 is pressurized to a pressure of greater than about 0.5 psi, such as greater than about 1.5 psi, such as greater than about 4 psi. Before pressurizing the inside cavity 204, the inside cavity 204 may be at atmospheric pressure and may be filled with air. Pressurizing the inside cavity 204 changes the downward load distribution of the liquid gas container 102 across a support slab.

At operation 404, the liquid gas container 102 may be loaded onto one or more transports, e.g., transport 105. The edges of the liquid gas container 102 may hang over the edge of a support surface 104 of the transport 105. In some embodiments, operation 402 and operation 404 may be swapped, such that the liquid gas container 102 is pressurized after being loaded onto the transport 105. Pressurizing the liquid gas container 102 after loading onto the transport 105 redistributes the downward load of the liquid gas container 102 as it is loaded onto the transport 105 and enables the transport 105 to be loaded more easily. Pressurization redistributes the downward load between different parts of the liquid gas container 102 and enables optimal application of the load to the transport 105.

At operation 406, the liquid gas container 102 is transported from a first location to a second location. After loading the liquid gas container 102 onto the transport 105 and pressurizing the liquid gas container 102 during operation 402 and operation 404, the liquid gas container 102 is transported from the first location to the second location. The first location may be a construction site where the liquid gas container 102 is constructed. The second location may be a customer site, such as a LNG, ammonia, or LPG storage facility. The first location and the second location may be separated by several miles. The liquid gas container 102 is transported over one or more roads. At least one of the one or more roads is narrower than the liquid gas container 102. Therefore, the liquid gas container 102 is not able to be supported at its edges for at least a part of the journey from the first location to the second location. One or more stand-by compressors may be utilized during transportation of the liquid gas container 102 to ensure the pressure within the liquid gas container 102 stays constant. The stand-by compressor enables the pressure to stay constant within the liquid gas container 102 despite any potential leaks or changes in ambient conditions. The stand-by compressors may be coupled with a bleed-off valve, such that the pressure within the liquid gas container 102 may be increased using the stand-by compressors or decreased using the bleed-off valve.

The pressurization of the liquid gas container during transport enables transportation on roads which otherwise cannot accommodate transports that can support the downward load of the liquid gas container along the entire width of the liquid gas container. Pressurization further reduces cracking of the support slab during transit for large and heavy liquid gas containers.

While the foregoing is directed to embodiments of the present disclosure, other and further embodiments of the disclosure may be devised without departing from the basic scope thereof, and the scope thereof is determined by the claims that follow.

What is claimed is:

1. A method of transporting a liquid gas container comprising:

pressurizing an inside cavity of the liquid gas container to a pressure, the liquid gas container comprising a support slab and at least one shell disposed on top of the support slab, wherein increasing the pressure within the inside cavity redistributes a downward load of the liquid gas container from an outer edge towards a center of the liquid gas container by creating an uplift of one or more edges of a support slab;

loading the liquid gas container onto a transport vehicle; and transporting the liquid gas container from a first location to a second location while pressurized.

2. The method of claim 1, wherein before pressurizing the inside cavity of the liquid gas container, the pressure of the inside cavity is greater than about 4 psi.

3. The method of claim 2, wherein prior to being pressurized, the inside cavity is filled with air.

4. The method of claim 1, wherein the liquid gas container comprises at least one shell forming the inside cavity and the shell is formed of a cryogenic metal material.

5. The method of claim 4, wherein the liquid gas container further comprises a support slab on which the at least one shell is disposed and where the support slab supports a downward load of the liquid gas container.

6. The method of claim 5, wherein the support slab is a reinforced concrete slab, a pre-stressed concrete slab, a perlite concrete slab, or a structural slab with steel grillage.

7. The method of claim 5, wherein the support slab is circular or polygonal and the at least one shell is a vertical cylinder circular.

8. The method of claim 5, wherein a mass of the liquid gas container is greater than 2500 metric tons.

9. The method of claim 4, wherein the cryogenic metal material is a cryogenic steel.

10. A method of transporting a container comprising:

pressurizing an inside cavity of the container to a pressure, the container comprising a support slab and at least one shell disposed on top of the support slab, wherein increasing the pressure within the inside cavity redistributes a downward load of the container from an outer edge towards a center of the container by creating an uplift of one or more edges of the support slab;

loading the container onto a transport vehicle; and transporting the container from a first location to a second location while pressurized and while an outer perimeter portion extends outward from a support surface of the transport vehicle, such that at least a portion of the support slab overhangs from the support surface of the transport vehicle.

11. The method of claim 10, wherein a width of one or both of the support slab and the at least one shell is greater than 20 meters in a direction perpendicular to a direction of travel during transporting of the container and a mass of the container is greater than 2500 metric tons.

12. The method of claim 10, wherein the container is a refrigerated liquid gas container.

13. The method of claim 12, wherein the container is a refrigerated liquid gas container and includes one or more insulation layers around an inner shell of the at least one shell.

14. The method of claim 10, wherein one or more stand-by compressors are utilized to maintain an internal pressure in the inside cavity during transporting of the container.

15. A method of transporting a liquid gas container comprising:

pressurizing an inside cavity of the liquid gas container to a pressure, the liquid gas container comprising a support slab and at least one shell disposed on top of the support slab, wherein increasing the pressure within the inside cavity redistributes a downward load of the liquid gas container from an outer edge towards a center of the liquid gas container by creating an uplift of one or more edges of the support slab;

loading the liquid gas container onto a transport vehicle; and transporting the liquid gas container from a first location to a second location while pressurized, the liquid gas container comprising at least one cryogenic metal shell forming the inside cavity and a support slab which supports a downward load of the cryogenic metal shell.

16. The method of claim 15, wherein a mass of the liquid gas container is greater than 2500 metric tons.

* * * * *